United States Patent
Ohmori

[19]

[11] Patent Number: 6,128,480
[45] Date of Patent: Oct. 3, 2000

[54] FIXED SUBSCRIBER UNIT FOR TELECOMMUNICATIONS

[75] Inventor: Tadashi Ohmori, Tokyo, Japan

[73] Assignee: Matsushita Electric Industrial Co., Ltd., Osaka, Japan

[21] Appl. No.: 09/081,577

[22] Filed: May 19, 1998

[30] Foreign Application Priority Data

May 30, 1997 [JP] Japan .................................... 9-156053

[51] Int. Cl.[7] .................................................. H04M 9/00
[52] U.S. Cl. ......................... 455/400; 455/423; 455/425; 455/67.1; 455/525
[58] Field of Search .................................... 455/423, 437, 455/424, 425, 67.1, 67.4, 67.5, 524, 525; 375/9

[56] References Cited

U.S. PATENT DOCUMENTS

| | | | |
|---|---|---|---|
| 5,195,091 | 3/1993 | Farewell et al. | 370/94.1 |
| 5,483,668 | 1/1996 | Malkamaki et al. | 455/33.2 |
| 5,570,373 | 10/1996 | Wing | 371/5.1 |
| 5,822,693 | 10/1998 | Harrison | 455/432 |
| 5,930,707 | 7/1999 | Vambaris et al. | 455/424 |
| 5,933,776 | 8/1999 | Kirkpatrick | 455/423 |
| 5,966,668 | 10/1999 | Lindroth | 455/555 |
| 5,978,659 | 11/1999 | Kim | 455/67.1 |

FOREIGN PATENT DOCUMENTS 6252909  9/1994  Japan .

*Primary Examiner*—Fan Tsang
*Assistant Examiner*—Marceau Milord
*Attorney, Agent, or Firm*—Lowe Hauptman Gopstein Gilman & Berner

[57] ABSTRACT

A fixed subscriber unit includes a memory which stores first information for radio capture of an actual base radio station and second information for radio capture of a pseudo base radio station. There is a switch whose position is changeable. One of the first information and the second information is selected in response to the position of the switch. Radio capture of one of the actual base radio station and the pseudo base radio station is implemented in response to the selected information.

7 Claims, 12 Drawing Sheets

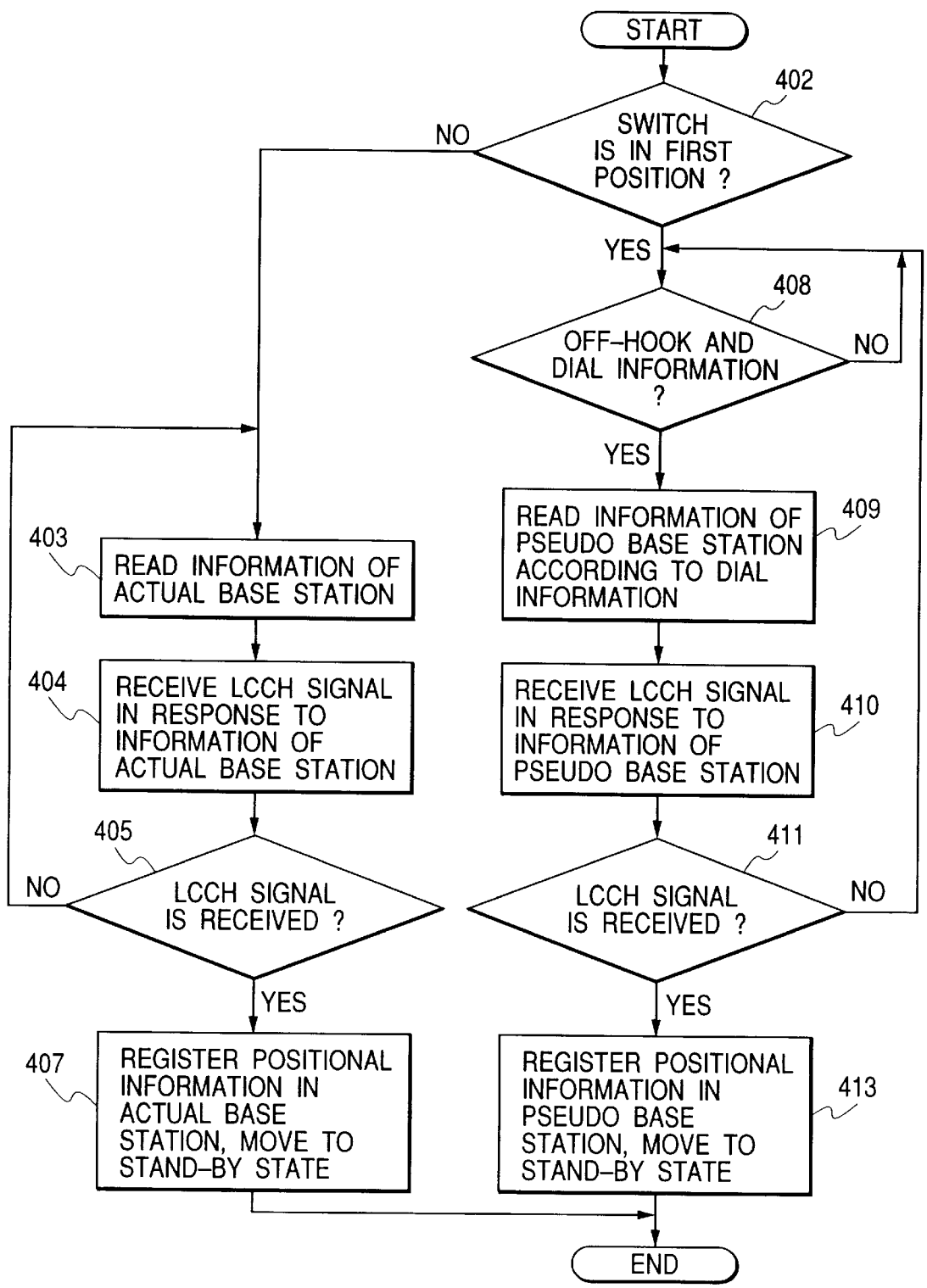

FIXED SUBSCRIBER UNIT FOR TELECOMMUNICATIONS

BACKGROUND OF THE INVENTION

1. Field of the Invention

This invention generally relates to a telephone communication apparatus, and particularly relates to a fixed subscriber unit for a telephone network including a wireless local loop. This invention also relates to a method of inspecting a fixed subscriber unit.

2. Description of the Related Art

It is known to provide a telephone network with a wireless local loop (WLL). In the WLL-based telephone network, a base radio station is located in or near a telephone office, and fixed subscriber units are provided in homes and places of businesses. A communication apparatus of the base radio station is connected to a communication apparatus of the telephone office. The communication apparatus of the telephone office is connected to a wire telephone network. Generally, telephone sets are connected to the fixed subscriber units, respectively. The fixed subscriber units can communicate with the base radio station by wireless. The fixed subscriber units and the base radio station compose a wireless communication network, that is, a WLL. In the WLL-based telephone network, a telephone set connected to a fixed subscriber unit can communicate with an arbitrary telephone set in the wire telephone network via the fixed subscriber unit, the base radio station, and the telephone office.

In a manufacturing factory, fixed subscriber units are inspected before they are shipped. The inspection of prior-art fixed subscriber units has complicated steps. Thus, the inspection of the prior-art fixed subscriber units tends to be low in efficiency.

SUMMARY OF THE INVENTION

It is a first object of this invention to provide an improved fixed subscriber unit.

It is a second object of this invention to provide an improved method of inspecting a fixed subscriber unit.

A first aspect of this invention provides a fixed subscriber unit comprising a memory storing first information for radio capture of an actual base radio station and second information for radio capture of a pseudo base radio station; a switch whose position is changeable; first means connected to the memory and the switch for selecting one of the first information and the second information in response to the position of the switch; and second means for implementing radio capture of one of the actual base radio station and the pseudo base radio station in response to the information selected by the first means.

A second aspect of this invention provides a method of inspecting a fixed subscriber unit including a memory which stores first information for reception of a first control radio channel assigned to an actual base radio station and second information for reception of a second control radio channel assigned to a pseudo base radio station. The method comprises the steps of selecting the second information from among the first information and the second information; enabling the fixed subscriber unit to receive the second radio channel in response to the selected second information; and implementing test radio communications between the fixed subscriber unit and the pseudo base radio station.

A third aspect of this invention provides a method of inspecting a fixed subscriber unit including a memory which stores first information for radio capture of an actual base radio station, second information for radio capture of a first pseudo base radio station, and third information for radio capture of a second pseudo radio base station. The method comprises the steps of connecting a telephone set to the fixed subscriber unit; selecting one of the second information and the third information by operating the telephone set; enabling the fixed subscriber unit to implement radio capture of the first pseudo base radio station in response to the second information when the second information is selected; and enabling the fixed subscriber unit to implement radio capture of the second pseudo base radio station in response to the third information when the third information is selected.

A fourth aspect of this invention is based on the second aspect thereof, and provides a method further comprising the steps of deciding whether the fixed subscriber unit succeeds or fails in reception of a control signal from the pseudo base radio station via the second radio channel when the fixed subscriber unit receives the second radio channel; and enabling the fixed subscriber unit to continue to receive the second radio channel.

BRIEF DESCRIPTION OF THE DRAWINGS

FIG. 12 is a flowchart of a segment of a program for a main controller in FIG. 11.

DESCRIPTION OF THE PREFERRED EMBODIMENTS

A prior-art WLL-based telephone network and a prior-art fixed subscriber unit therein will be explained hereinafter for a better understanding of this invention.

Figure 1:
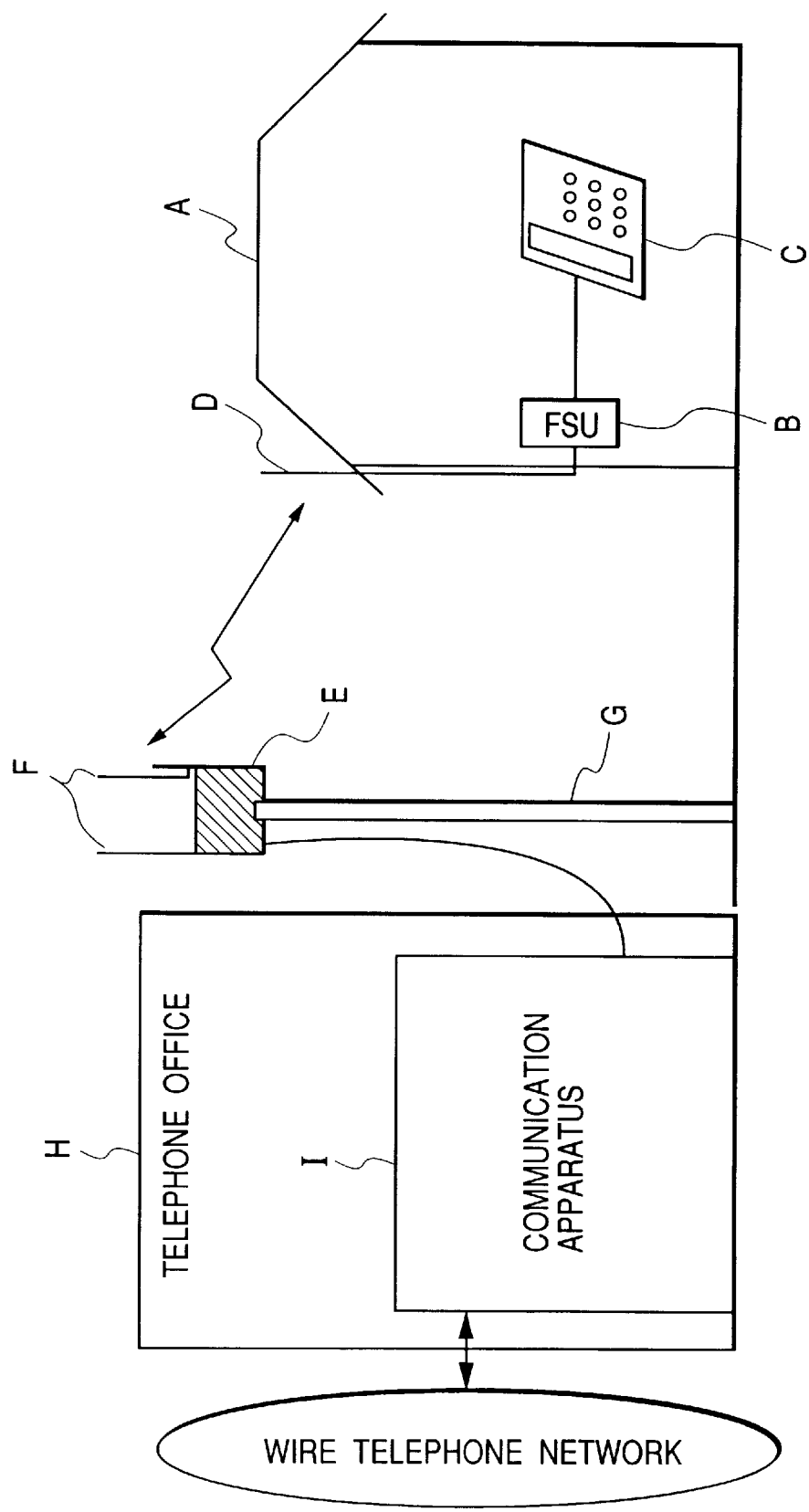
FIG. 1 is a diagram of a prior-art WLL-based telephone network.

FIG. 1 shows a prior-art WLL-based telephone network which includes a fixed subscriber unit (FSU) "B" located in a home "A". A telephone set "C" placed in the home "A" is connected to the fixed subscriber unit "B" via a telephone cord. An antenna "D" is provided outside the home "A". The antenna "D" is close to the home "A". The antenna "D" is connected to the fixed subscriber unit "B" via a cable.

In the prior-art WLL-based telephone network of FIG. 1, a base radio station "E" is mounted on the top of a pole "G" located outside a telephone office "H". The base radio station "E" is provided with antennas "F". The base radio station "E" and the fixed subscriber unit "B" can communicate with each other by radio. The base radio station "E" is close to the telephone office "H". The base radio station "E" is connected to a communication apparatus "I" in the telephone office "H" via a cable. The communication apparatus "I" in the telephone office "H" is connected to a wire telephone network "J".

Figure 2:
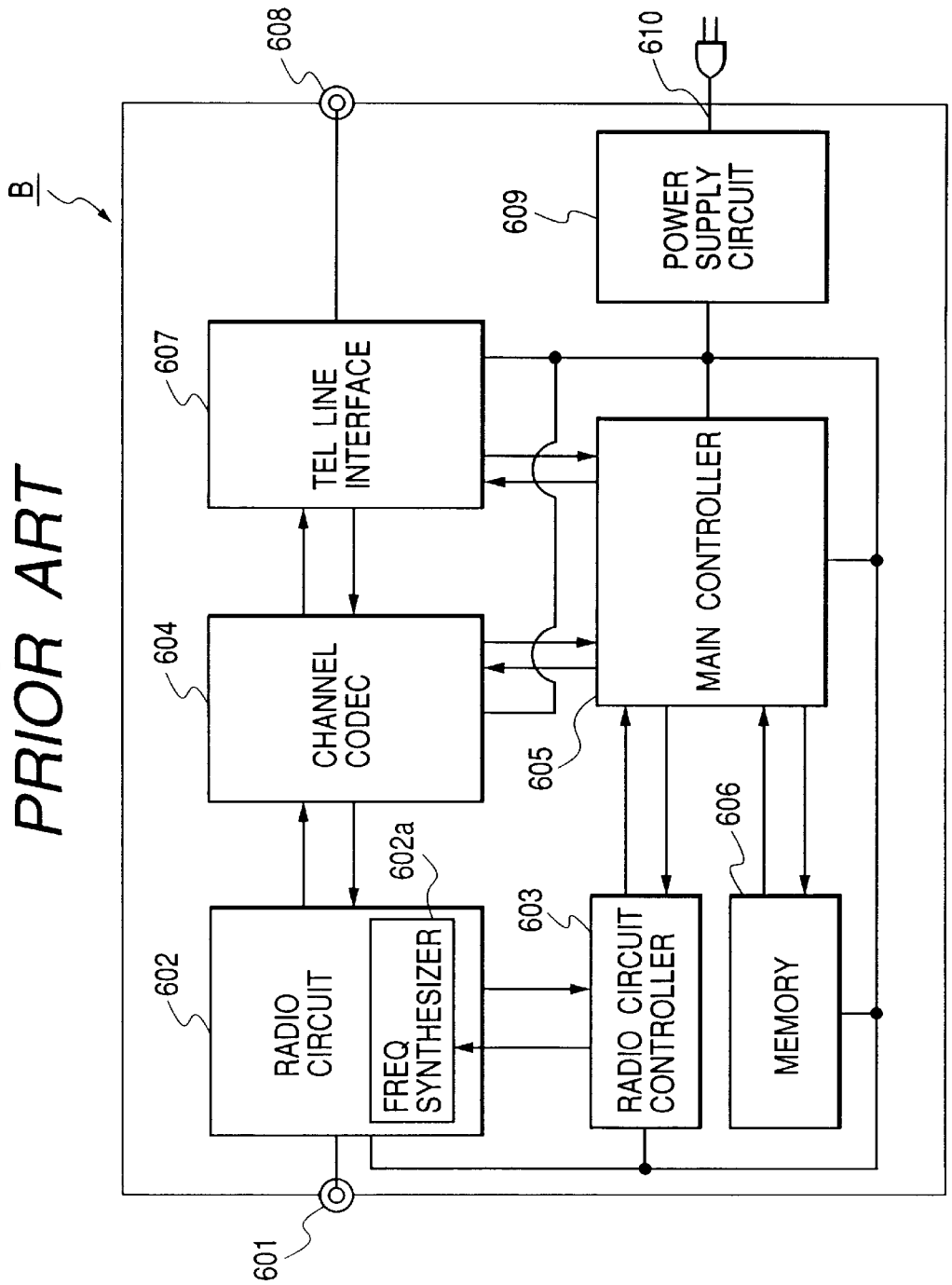
FIG. 2 is a block diagram of a prior-art fixed subscriber unit in FIG. 1.

As shown in FIG. 2, the prior-art fixed subscriber unit "B" includes a connector 601, a radio circuit 602, a radio circuit controller 603, a channel codec section 604, a main controller 605, a memory 606, a telephone line interface 607, a connector 608, a power supply circuit 609, and a power supply cord 610.

The connector 601 is connected to the antenna "D" (see FIG. 1) via the cable. The radio circuit 602 is connected to the connector 601. Also, the radio circuit 602 is connected to the radio circuit controller 603 and the channel codec section 604. The channel codec section 604 is connected to the telephone line interface 607. The telephone line interface 607 is connected to the connector 608. The connector 608 is connected to the telephone set "C" (see FIG. 1) via the telephone cord. The main controller 605 is connected to the radio circuit controller 603, the channel codec section 604, the memory 606, and the telephone line interface 607. The power supply circuit 609 is connected to the radio circuit 602, the radio circuit controller 603, the channel codec section 604, the main controller 605, the memory 606, and the telephone line interface 607.

The radio circuit 602 includes a radio transmitter, a radio receiver, and a frequency synthesizer 602a connected to the radio transmitter and the radio receiver. The frequency synthesizer 602a generates a signal, the frequency of which is designated by a control signal fed from the radio circuit controller 603. The signal generated by the frequency synthesizer 602a is used by the radio transmitter and the radio receiver. The signal generated by the frequency synthesizer 602a determines the frequency of a radio signal transmitted by the radio transmitter and the frequency of a radio signal received by the radio receiver. The radio circuit 602 converts transmission baseband data into a corresponding transmission radio signal in response to the signal generated by the frequency synthesizer 602a. The radio circuit 602 feeds the transmission radio signal to the antenna "D" (see FIG. 1) via the cable and the connector 601. The transmission radio signal is radiated by the antenna "D" (see FIG. 1) toward the base radio station "E" (see FIG. 1). On the other hand, a radio signal transmitted from the base radio station "E" (see FIG. 1) is received by the antenna "D" (see FIG. 1). The received radio signal is fed from the antenna "D" (see FIG. 1) to the radio circuit 602 via the cable and the connector 601. The radio circuit 602 demodulates or converts the received radio signal into received baseband data (recovered baseband data) in response to the signal generated by the frequency synthesizer 602a. The frequency of a transmission radio signal generated by the radio circuit 602, the frequency of a radio signal received and selected by the radio circuit 602, and timings of signal transmission and signal reception by the radio circuit 602 are determined by control signals fed from the radio circuit controller 603.

The radio circuit 602 has a section for generating a signal depending on the strength (the field strength) of the received radio signal. The radio circuit controller 603 refers to the strength-dependent signal in the radio circuit 602, and thereby measures the strength (the level) of the received radio signal. The radio circuit controller 603 generates a signal of the measured level (the measured strength), and outputs the measured level signal to the main controller 605. The main controller 605 writes the measured level signal into a RAM (random access memory) provided therein.

Control channels and a communication channel selected from among plural radio channels are used by radio communications between the base radio station "E" and the fixed subscriber unit "B" (see FIG. 1). The control channels contain a logic control channel (LCCH) which is assigned to the base radio station "E".

The channel codec section 604 has a first encoder which receives signals from the main controller 605, and which encodes the received signals into transmission baseband data assigned to the control channels. The channel codec section 604 also has a second encoder which receives signals from the main controller 605 and the telephone line interface 607, and which encodes the received signals into transmission baseband data assigned to the communication channel. The transmission baseband data assigned to the control channels and the transmission baseband data assigned to the communication channel are outputted from the channel codec section 604 to the radio circuit 602. Regarding the transmission baseband data assigned to the communication channel, the signals fed to the channel codec section 604 from the main controller 605 contain control information while the signals fed to the channel code section 604 from the telephone line interface 607 contain voice information.

In addition, the channel codec section 604 has a first decoder receiving recovered baseband data from the radio circuit 602 which relates to the control channels, and decoding the received baseband data. The channel codec section 604 also has a second decoder receiving recovered baseband data from the radio circuit 602 which relates to the communication channel, and for decoding the received baseband data. The decoding-resultant signals which relate to the control channels are outputted from the channel codec section 604 to the main controller 605. The decoding-resultant signals which relate to the communication channel are distributed from the channel codec section 604 to the main controller 605 and the telephone line interface 607. The decoding-resultant signals relating to the communication channel and fed to the main controller 605 contain control information. The decoding-resultant signals relating to the communication channel and fed to the telephone line interface 607 contain voice information.

The telephone line interface 607 includes a voice codec circuit. The voice codec circuit has an encoder which receives a voice-representing signal from the telephone set "C" (see FIG. 1) via the telephone cord and the connector 608, and which encodes the received voice-representing signal into a corresponding signal of a given code. The encoder outputs the given-code voice-representing signal to the channel codec section 604. The voice codec circuit has a decoder which receives the output signal of the channel codec section 604, and which decodes the received signal into a corresponding voice-representing signal. The decoder transmits the voice-representing signal to the telephone set "C" (see FIG. 1) via the telephone code and the connector 608.

Also, the telephone line interface 607 includes a telephone line circuit, a circuit for generating a signal representing the reception of an incoming call, a circuit for detecting whether the telephone set "C" (see FIG. 1) is in an off-hook state or an on-hook state, a circuit for detecting a dial condition of the telephone set "C" (see FIG. 1), and a circuit for generating tone signals such as a dial tone signal, a busy tone signal, and a howler tone signal. The generated tone signals are fed from the telephone line interface 607 to the telephone set "C" (see FIG. 1) via the telephone cord and the connector 608.

The memory 606 stores information which is used by the main controller 605 to recognize and capture the base radio station "E" (see FIG. 1). Preferably, the memory 606 is of the nonvolatile type.

The main controller 605 includes a microcomputer or a similar device having a combination of an input/output port, a processing section, a ROM, and a RAM. The main controller 605 operates in accordance with a program stored in the ROM.

The power supply circuit 609 receives ac power via the power supply cord 610. The power supply circuit 609 converts the ac power into dc power. The power supply circuit 609 feeds the dc power to the radio circuit 602, the radio circuit controller 603, the channel codec section 604, the main controller 605, the memory 606, and the telephone line interface 607 to activate them.

In the prior-art WLL-based telephone network of FIG. 1, the fixed subscriber unit "B" and the base radio station "E" are designed according to the TDMA/TDD PHS (Personal Handy Phone) standards. While operation of the base radio station "E" remains in a stand-by mode, the base radio station "E" repetitively transmits an LCCH (logic control channel) signal to the fixed subscriber unit "B" at a predetermined period via the logic control channel (LCCH) being one of the control channels.

With reference to FIG. 2, the memory 606 in the fixed subscriber unit "B" stores registered information of the base radio station "E" (see FIG. 1). When the power supply cord 610 is connected to an ac power line, the fixed subscriber unit "B" starts to operate. Then, the fixed subscriber unit "B" receives and accepts an LCCH signal from a base radio station corresponding to the base-radio-station information in the memory 606.

The registered base-radio-station information in the memory 606 includes an information piece representing the carrier identification number (the control carrier number) of the logic control channel (LCCH) assigned to and used by the base radio station "E", and an information piece representing the business company identification number (the system ID) of the base radio station "E".

The main controller 605 is programmed to implement the following processes. After the fixed subscriber unit "B" starts to operate, the main controller 605 reads out the information piece of the control carrier number from the memory 606. The main controller 605 generates a frequency setting signal in response to the information piece of the control carrier number. The main controller 605 outputs the frequency setting signal to the radio circuit controller 603. The radio circuit controller 603 converts the frequency setting signal into a corresponding control signal. The radio circuit controller 603 outputs the control signal to the frequency synthesizer 602a in the radio circuit 602. Thus, the frequency of the signal generated by the frequency synthesizer 602a is set to a value corresponding to the previously-mentioned control carrier number. Subsequently, the main controller 605 accesses the radio circuit 602 via the channel codec section 604, and changes the radio circuit 602 to a continuous reception state in which the radio circuit 602 continuously receives the logic control channel (LCCH) assigned to the base radio station "E". The main controller 605 reads out the information of the system ID from the memory 606. The main controller 605 searches for an LCCH signal from a base radio station corresponding to the previously-mentioned system ID.

Figure 3:
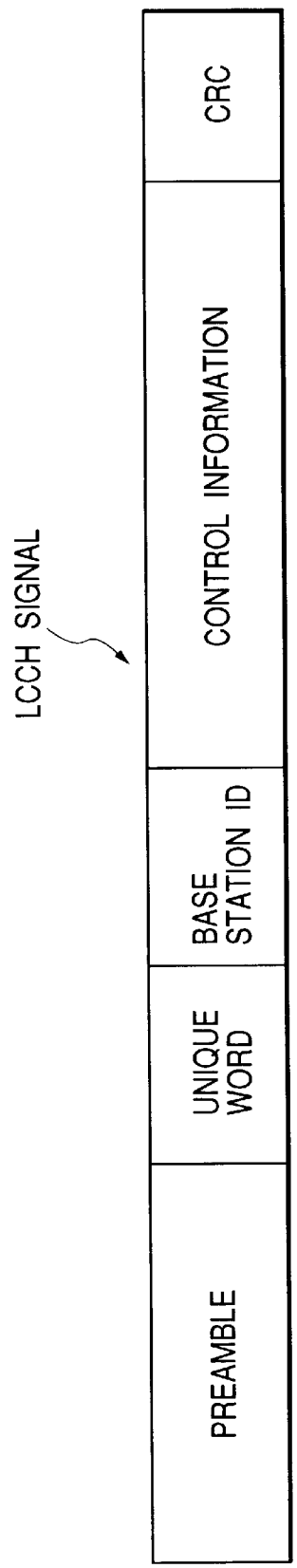
FIG. 3 is a diagram of the contents of a prior-art LCCH (logic control channel) signal.

As shown in FIG. 3, every LCCH signal conforming to the PHS standards "RCR STD-28", which is transmitted from a base radio station (for example, the base radio station "E"), contains a sequence of a preamble signal PR, a signal of a unique word for synchronization, an information piece of an identification number of the base radio station, a control information piece, and a CRC information piece for error correction. The information piece of the identification number of the base radio station has 42 bits, and 9 former bits thereof represent the system ID.

Figure 4:
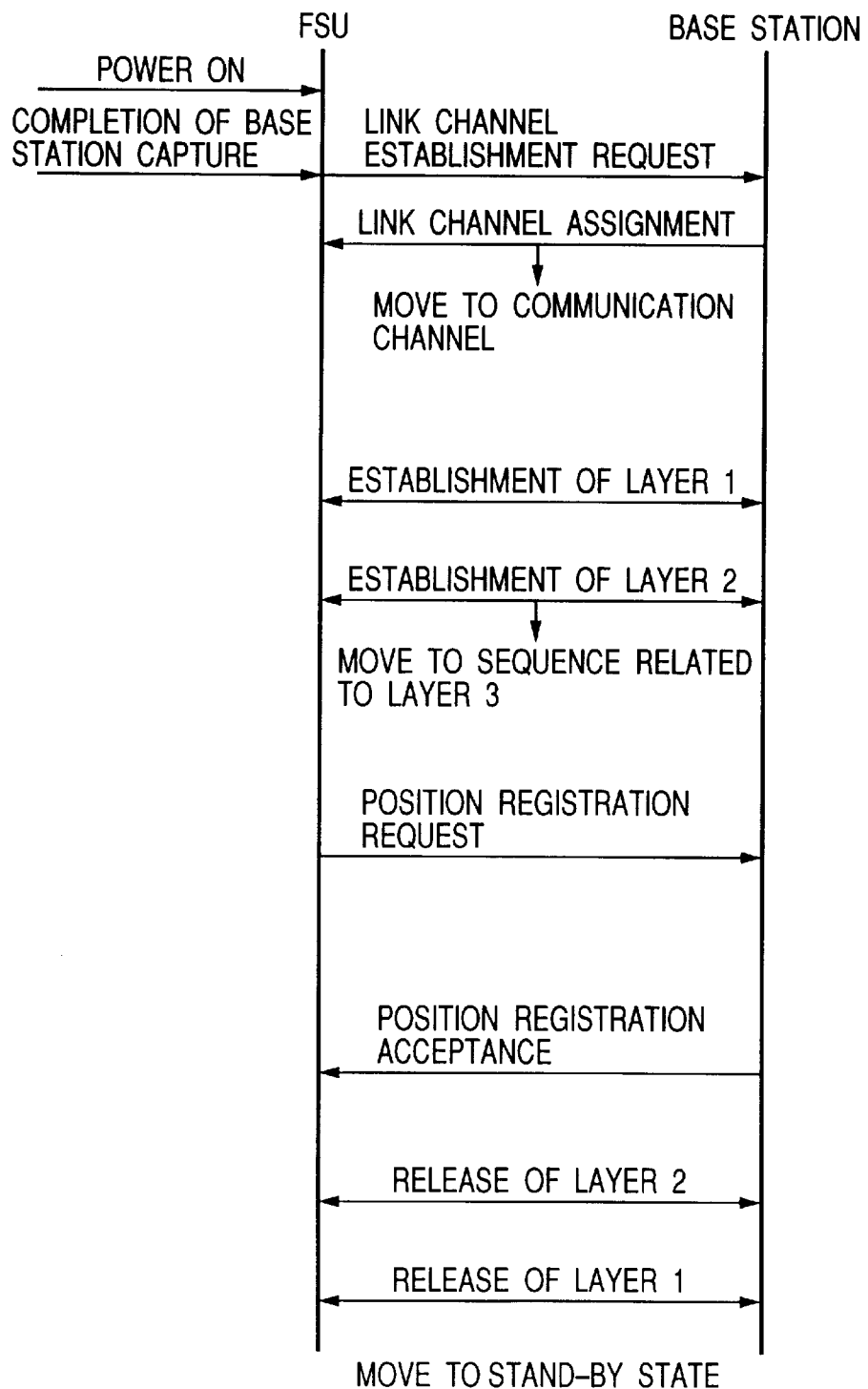
FIG. 4 is a diagram of a position registration sequence of communications between the prior-art fixed subscriber unit and a prior-art base radio station in FIG. 1.

FIG. 4 shows a position registration sequence of communications which conforms to the PHS standards "RCR STD 28". The position registration sequence in FIG. 4 is implemented between the fixed subscriber unit "B" and the base radio station "E". During an LCCH-signal search mode of operation of the fixed subscriber unit "B", the main controller 605 fetches, from the channel codec section 604, an information piece of a system ID (a received system ID) which is derived from a received LCCH signal. The main controller 605 collates the received system ID with the registered system ID which is read out from the memory 606. When the received system ID agrees with the registered system ID, the main controller 605 controls the channel codec section 604 to capture the base radio station (the base radio station "E") which transmits the received LCCH signal. Subsequently, the main controller 605 controls the channel codec section 604 and also controls the radio circuit 602 via the channel codec section 604 so that positional information of the fixed subscriber unit "B" will be transmitted to and registered in the base radio station "E". The positional information of the fixed subscriber unit "B" is further transmitted from the base radio station "E" to the communication apparatus "I" in the telephone office "H". As a result, the fixed subscriber unit "B" is able to accept an incoming call. When the registration of the positional information of the fixed subscriber unit "B" has been completed, the fixed subscriber unit "B" falls into a stand-by state.

Figure 5:
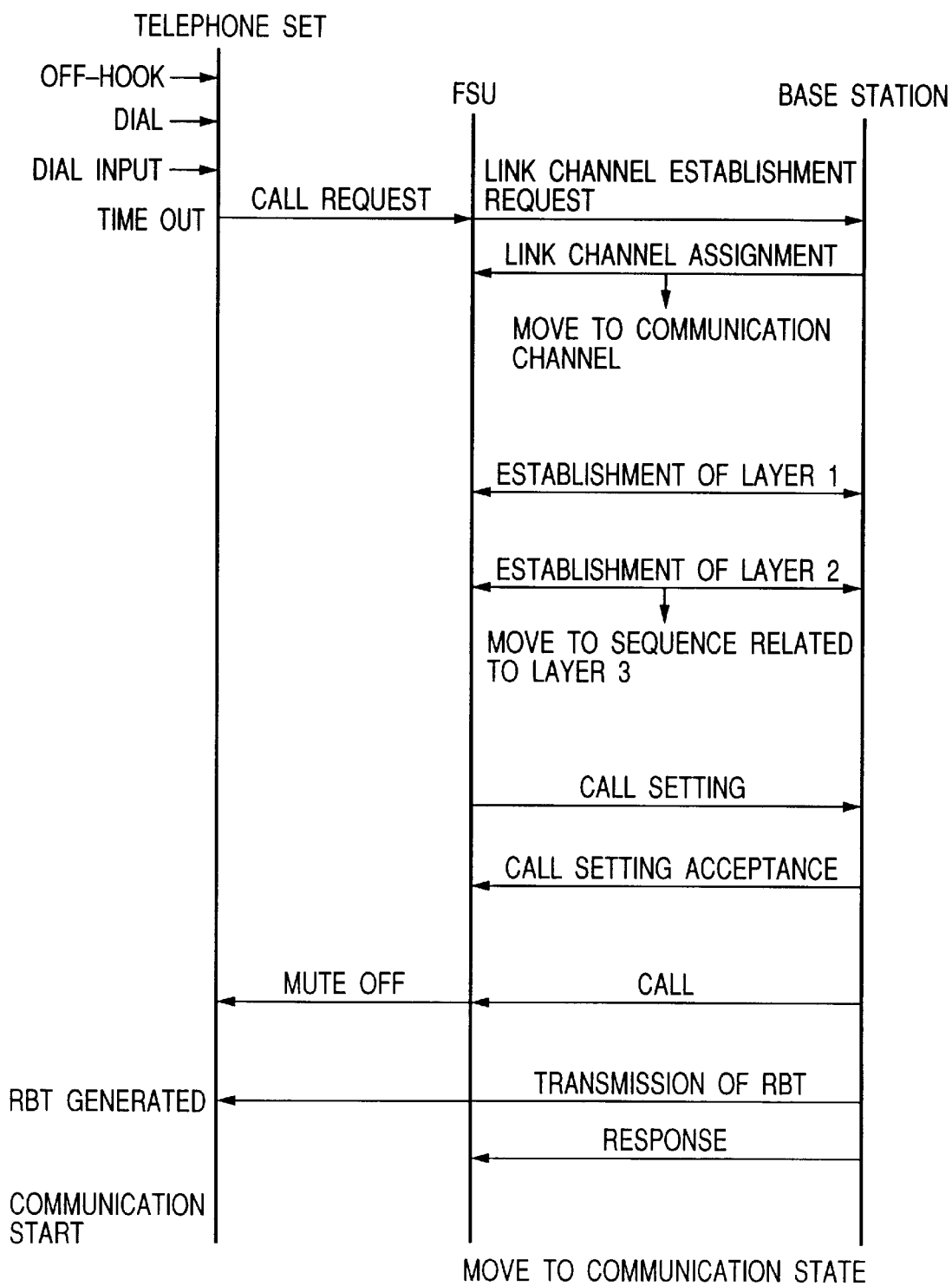
FIG. 5 is a diagram of a call sequence of communications among a prior-art telephone set, the prior-art fixed subscriber unit, and the prior-art base radio station in FIG. 1.

FIG. 5 shows a call sequence of communications which conforms to the PHS standards "RCR STD-28". The call sequence in FIG. 5 is implemented among the telephone set "C", the fixed subscriber unit "B", and the base radio station "E". In the case where a user changes the telephone set "C" to its off-hook state and depresses a dial button of the telephone set "C" after the registration of the positional information of the fixed subscriber unit "B" has been completed, the telephone line interface 607 detects the change of the telephone set "C" to its off-hook state and receives, from the telephone set "C", information of the depressed dial button. The telephone line interface 607 informs the main controller 605 of the change of the telephone set "C" to its off-hook state. The main controller 605 controls the telephone line interface 607 in response to the off-hook information so that the telephone line interface 607 will generate a tone signal corresponding to the depressed dial button. The telephone line interface 607 transmits the tone signal to the telephone set "C". Accordingly, the user can hear a sound from the telephone set "C" which is represented by the tone signal corresponding to the depressed dial button.

Subsequently, the user successively depress dial buttons of the telephone set "C" to input a telephone number of a destination to which a call is directed while hearing tones corresponding to the depressed dial buttons. Generally, the destination is connected to the wire telephone network "J". The telephone set "C" generates a dial signal in response to the depression of dial buttons. The dial signal is transmitted from the telephone set "C" to the fixed subscriber unit "B". The dial signal is detected by the telephone line interface 607 in the fixed subscriber unit "B". The telephone line interface 607 informs the main controller 605 of the dial signal detection. The main controller 605 sets a given waiting time in response to the dial signal detection. After the given waiting time has elapsed, the main controller 605 controls the channel codec section 604 and also controls the radio circuit 602 via the channel codec section 604 so that the fixed subscriber unit "B" will transmit a call to the base radio station "E". The call is further transmitted from the base radio station "E" to the destination via the communication apparatus "I" in the telephone office "H". The communication apparatus "I" in the telephone office "H" returns a ring back tone signal (an RBT signal) toward the telephone set "C" via the base radio station "E" and the fixed subscriber unit "B". During the transmission of the call, the main controller 605 drives the voice codec circuit in the telephone line interface 607, and hence the ring back tone signal is suitably processed by the voice codec circuit before being transmitted to the telephone set "C". Thus, the user can hear sounds from the telephone set "C" which are represented by the ring back tone signal. When a telephone set in the destination responds to the call, the user starts voice communication with the opposite party.

Figure 6:
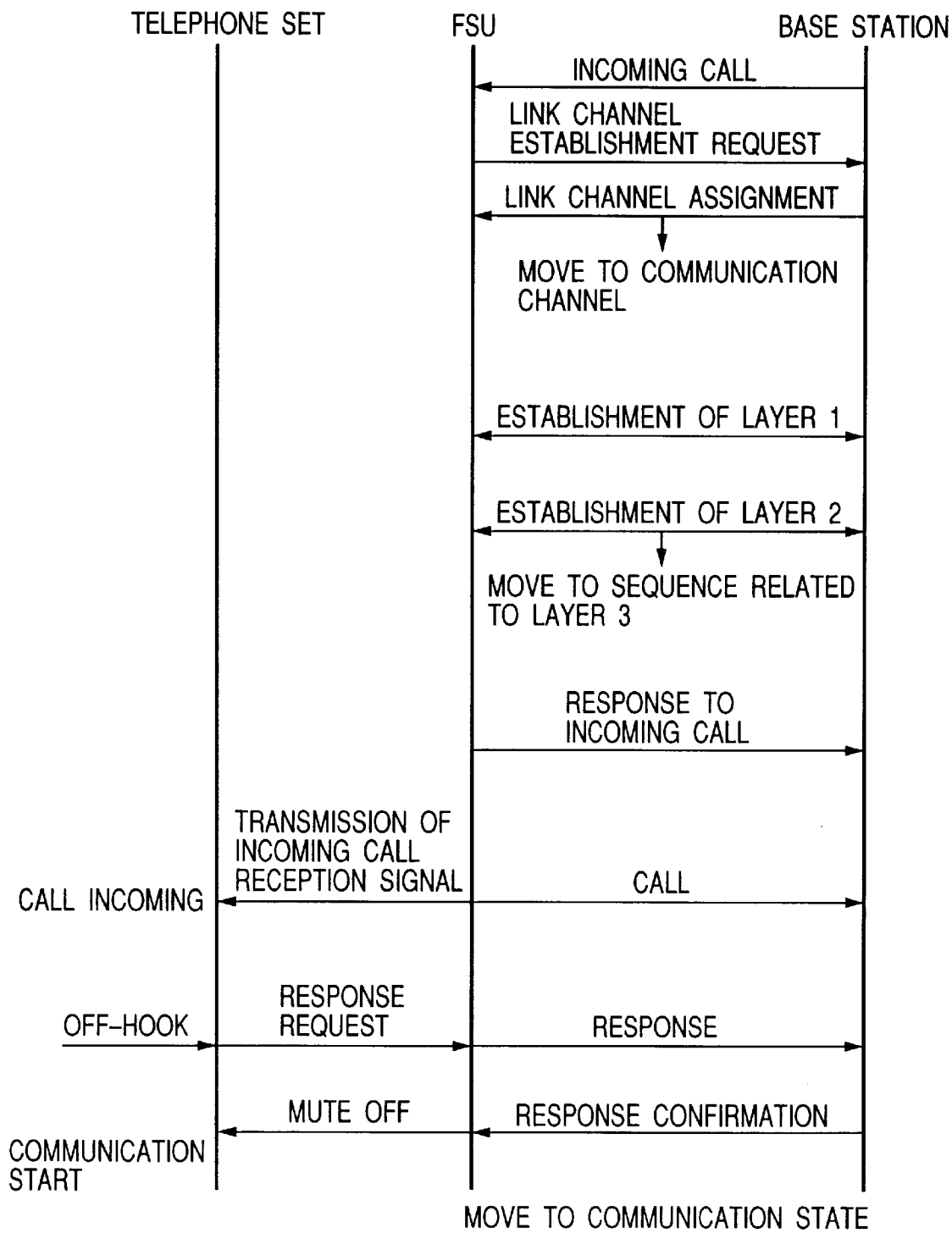
FIG. 6 is a diagram of an incoming-call reception sequence of communications among the prior-art telephone set, the prior-art fixed subscriber unit, and the prior-art base radio station in FIG. 1.

FIG. 6 shows an incoming-call reception sequence of communications which conforms to the PHS standards "RCR STD 28". The incoming-call reception sequence in FIG. 6 is implemented among the base radio station "E", the fixed subscriber unit "B", and the telephone set "C". It is assumed that the communication apparatus "I" in the telephone office "H" receives, from the wire telephone network "J", an incoming call directed to the telephone set "C". The communication apparatus "I" in the telephone office "H" transmits the incoming call to the fixed subscriber unit "B" via the base radio station "E". In the fixed subscriber unit "B", the channel codec section 604 informs the main controller 605 of the reception of the incoming call. The main controller 605 controls the telephone line interface 607 in response to the incoming-call reception so that the telephone line interface 607 will generate a signal of the reception of the incoming call and will output the incoming-call reception signal to the telephone set "C". The telephone set "C" generates a ringer sound in response to the incoming-call reception signal. Accordingly, the user is notified of the presence of the incoming call.

When the user changes the telephone set "C" to its off-hook state in response to the ringer sound, the telephone line interface 607 in the fixed subscriber unit "B" detects the change of the telephone set "C" to its off-hook state. The telephone line interface 607 informs the main controller 605 of the change of the telephone set "C" to its off-hook state. The main controller 605 controls the channel codec section 604 and also controls the radio circuit 602 via the channel codec section 604 in response to the off-hook information so that the fixed subscriber unit "B" will transmit a response message to the base radio station "E". Normally, the base radio station "E" returns a response confirmation message to the fixed subscriber unit "B" after receiving the response message from the fixed subscriber unit "B". When the response confirmation message is received by the fixed subscriber unit "B", the user is allowed to start voice communication with the opposite party via the telephone set "C".

A manufacturing factory for prior-art fixed subscriber units identical with the fixed subscriber unit "B" of FIG. 2 has a pseudo base radio station for an inspection of each of the fixed subscriber units. Specifically, during an inspection of the fixed subscriber unit "B" in the manufacturing factory, the memory 606 in the fixed subscriber unit "B" is loaded with information of the pseudo base radio station. Then, the position registration sequence of communications, the call sequence of communications, and the incoming-call reception sequence of communications are implemented between the fixed subscriber unit "B" and the pseudo base radio station to check whether the fixed subscriber unit "B" operates normally regarding these sequences. After it is confirmed that the fixed subscriber unit "B" operates normally, the information of the pseudo base radio station in the memory 606 is replaced by information of an actual base radio station with which the fixed subscriber unit "B" will be associated. The replacement of information in the memory 606 causes the whole of the inspection to be complicated.

First Embodiment

Figure 7:
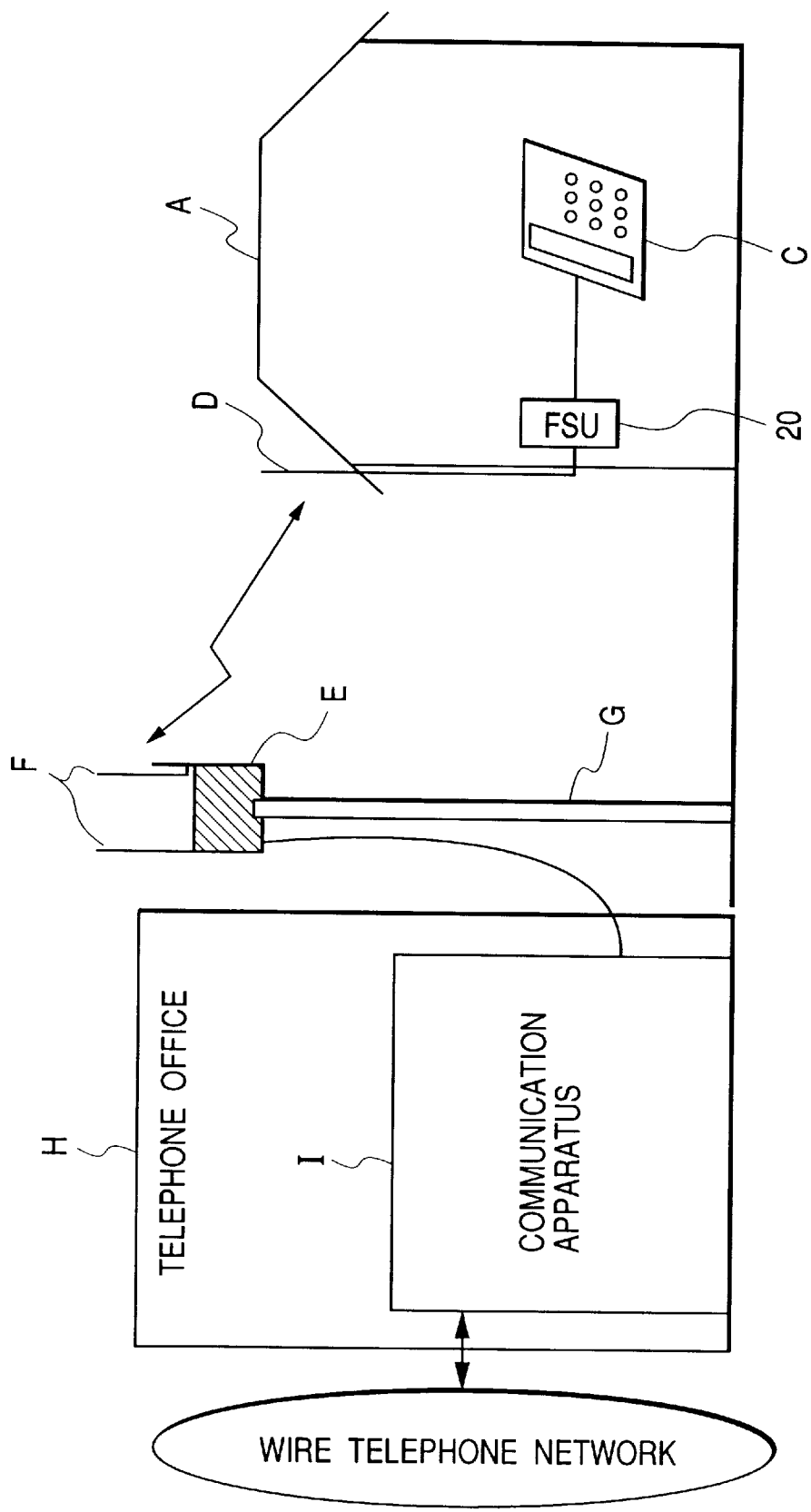
FIG. 7 is a diagram of a WLL-based telephone network including a fixed subscriber unit according to a first embodiment of this invention.

FIG. 7 shows an actual WLL-based telephone network which includes a fixed subscriber unit (FSU) 20 according to a first embodiment of this invention. The fixed subscriber unit 20 is located in a home "A". A telephone set "C" placed in the home "A" is connected to the fixed subscriber unit 20 via a telephone cord. An antenna "D" is provided outside the home "A". The antenna "D" is close to the home "A". The antenna "D" is connected to the fixed subscriber unit 20 via a cable.

In the actual WLL-based telephone network of FIG. 7, an actual base radio station "E" is mounted on the top of a pole "G" located outside a telephone office "H". The actual base radio station "E" is provided with antennas "F". The actual base radio station "E" and the fixed subscriber unit 20 can communicate with each other by radio. The actual base radio station "E" is close to the telephone office "H". The actual base radio station "E" is connected to a communication apparatus "I" in the telephone office "H" via a cable. The communication apparatus "I" in the telephone office "H" is connected to a wire telephone network "J".

Figure 8:
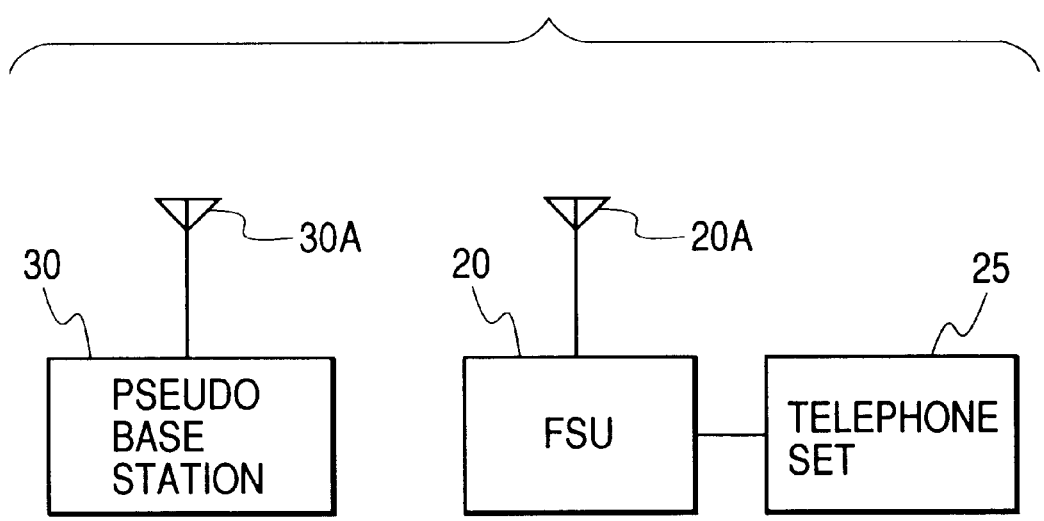
FIG. 8 is a diagram of a combination of a pseudo base radio station, a telephone set, and the fixed subscriber unit in the first embodiment of this invention which is set in a manufacturing factory.

FIG. 8 shows a condition of a manufacturing factory in which the fixed subscriber unit 20 is inspected before being shipped. As shown in FIG. 8, an antenna 20A and a telephone set 25 are connected to the fixed subscriber unit 20. The inspection uses a pseudo base radio station 30 provided with an antenna 30A. During the inspection, test radio communications are implemented between the fixed subscriber unit 20 and the pseudo base radio station 30 to check operation of the fixed subscriber unit 20. In addition, test communications are implemented between the fixed subscriber unit 20 and the telephone set 25.

Figure 9:
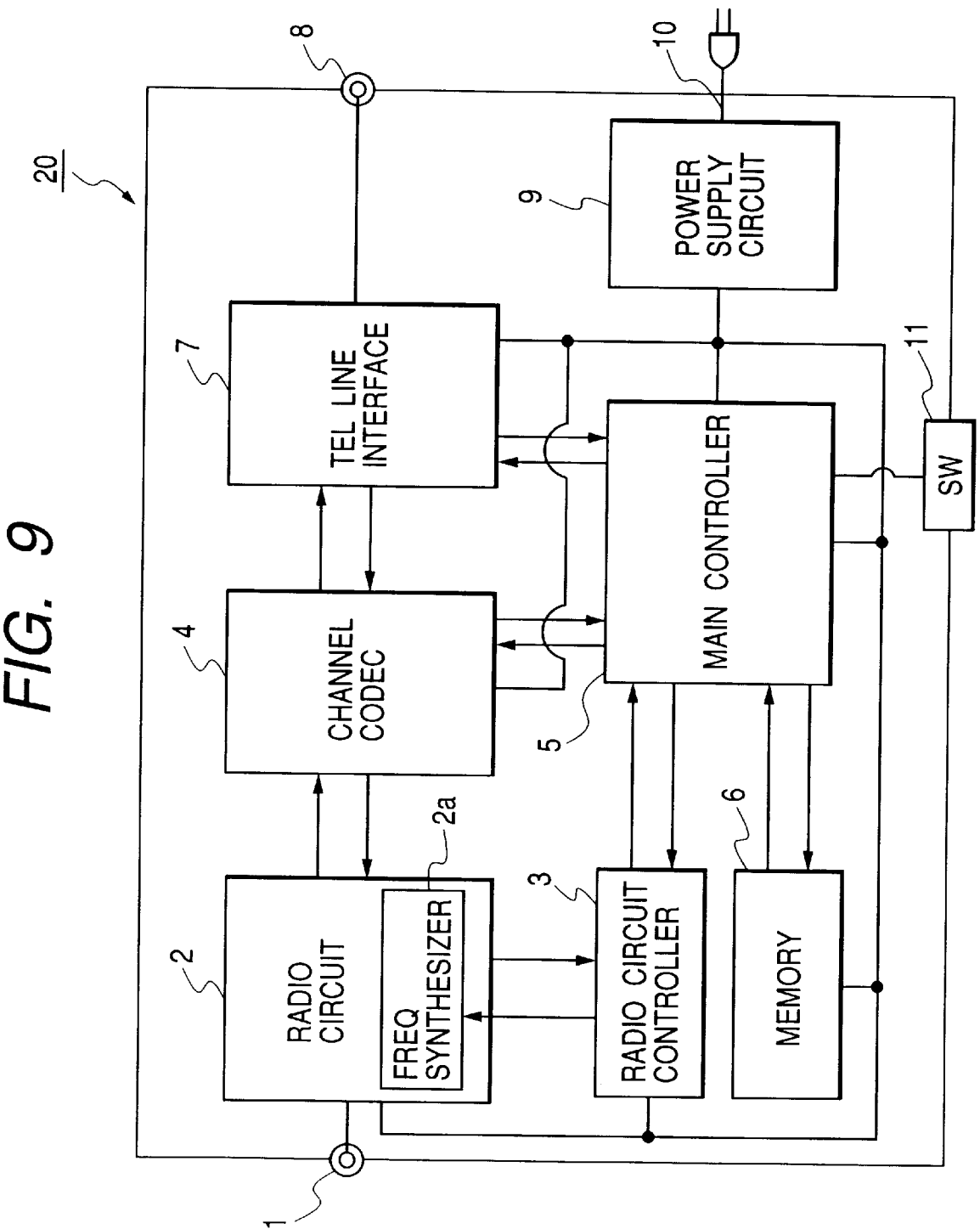
FIG. 9 is a block diagram of the fixed subscriber unit in FIGS. 7 and 8.

FIG. 9 shows a fixed subscriber unit 20 according to the first embodiment of this invention. As shown in FIG. 9, the fixed subscriber unit 20 includes a connector 1, a radio circuit 2, a radio circuit controller 3, a channel codec section 4, a main controller 5, a memory 6, a telephone line interface 7, a connector 8, a power supply circuit 9, a power supply cord 10, and a switch 11.

The connector 1 can be connected to an antenna via a cable. The radio circuit 2 is connected to the connector 1. Also, the radio circuit 2 is connected to the radio circuit controller 3 and the channel codec section 4. The channel codec section 4 is connected to the telephone line interface 7. The telephone line interface 7 is connected to the connector 8. The connector 8 can be connected to a telephone set via a telephone cord. The main controller 5 is connected to the radio circuit controller 3, the channel codec section 4, the memory 6, the telephone line interface 7, and the switch 11. The power supply circuit 9 is connected to the radio circuit 2, the radio circuit controller 3, the channel codec section 4, the main controller 5, the memory 6, and the telephone line interface 7.

The radio circuit 2 includes a radio transmitter, a radio receiver, and a frequency synthesizer 2a connected to the radio transmitter and the radio receiver. The frequency synthesizer 2a generates a signal, the frequency of which is designated by a control signal fed from the radio circuit controller 3. The signal generated by the frequency synthesizer 2a is used by the radio transmitter and the radio receiver. The signal generated by the frequency synthesizer 2a determines the frequency of a radio signal transmitted by the radio transmitter and the frequency of a radio signal received by the radio receiver. The radio circuit 2 converts transmission baseband data into a corresponding transmission radio signal in response to the signal generated by the frequency synthesizer 2a. The radio circuit 2 feeds the transmission radio signal to the antenna via the cable and the connector 1. The transmission radio signal is radiated by the antenna toward a base radio station. On the other hand, a radio signal transmitted from the base radio station is received by the antenna. The received radio signal is fed from the antenna to the radio circuit 2 via the cable and the connector 1. The radio circuit 2 demodulates or converts the received radio signal into received baseband data (recovered baseband data) in response to the signal generated by the frequency synthesizer 2a. The frequency of a transmission radio signal generated by the radio circuit 2, the frequency of a radio signal received and selected by the radio circuit 2, and timings of signal transmission and signal reception by the radio circuit 2 are determined by control signals fed from the radio circuit controller 3.

The radio circuit 2 has a section for generating a signal depending on the strength (the field strength) of the received radio signal. The radio circuit controller 3 refers to the strength-dependent signal in the radio circuit 2, and thereby measures the strength (the level) of the received radio signal. The radio circuit controller 3 generates a signal of the measured level (the measured strength), and outputs the measured level signal to the main controller 5. The main controller 5 writes the measured level signal into a RAM (random access memory) provided therein.

Control channels and a communication channel selected from among plural radio channels are used by radio communication between a base radio station and the fixed subscriber unit 20. The control channels contain a logic control channel (LCCH) which is assigned to the base radio station.

The channel codec section 4 has a first encoder which receives signals from the main controller 5, and which encodes the received signals into transmission baseband data assigned to the control channels. The channel codec section 4 also has a second encoder which receives signals from the main controller 5 and the telephone line interface 7, and which encodes the received signals into transmission baseband data assigned to the communication channel. The transmission baseband data assigned to the control channels and the transmission baseband data assigned to the communication channel are outputted from the channel codec section 4 to the radio circuit 2. Regarding the transmission baseband data assigned to the communication channel, the signals fed to the channel codec section 4 from the main controller 5 contain control information while the signals fed to the channel code section 4 from the telephone line interface 7 contain voice information.

In addition, the channel codec section 4 has a first decoder receiving recovered baseband data from the radio circuit 2 which relates to the control channels, and decoding the received baseband data. The channel codec section 4 has a second decoder receiving recovered baseband data from the radio circuit 2 which relates to the communication channel, and decoding the received baseband data. The decoding-resultant signals which relate to the control channels are outputted from the channel codec section 4 to the main controller 5. The decoding-resultant signals which relate to the communication channel are distributed from the channel codec section 4 to the main controller 5 and the telephone line interface 7. The decoding-resultant signals relating to the communication channel and fed to the main controller 5 contain control information. The decoding-resultant signals relating to the communication channel and fed to the telephone line interface 7 contain voice information.

The telephone line interface 7 includes a voice codec circuit. The voice codec circuit has an encoder which receives a voice representing signal from the telephone set via the telephone cord and the connector 8, and which encodes the received voice-representing signal into a corresponding signal of a given code. The encoder outputs the given-code voice-representing signal to the channel codec section 4. The voice codec circuit has a decoder which receives the output signal of the channel codec section 4, and which decodes the received signal into a corresponding voice-representing signal. The decoder transmits the voice-representing signal to the telephone set via the telephone code and the connector 8.

Also, the telephone line interface 7 includes a telephone line circuit, a circuit for generating a signal representing the reception of an incoming call, a circuit for detecting whether the telephone set is in an off-hook state or an on-hook state, a circuit for detecting a dial condition of the telephone set, and a circuit for generating tone signals such as a dial tone signal, a busy tone signal, and a howler tone signal. The generated tone signals are fed from the telephone line interface 7 to the telephone set via the telephone cord and the connector 8.

The memory 6 stores registered information which is used by the main controller 5 to recognize and capture a base radio station. Preferably, the memory 6 is of the nonvolatile type. Specifically, the memory 6 stores an information piece of a pseudo base radio station (the pseudo base radio station 30) and also an information piece of an actual base radio station (the actual base radio station "E") with which the fixed subscriber unit 20 will be associated. For example, these information pieces are written into and registered in the memory 6 in the manufacturing factory.

The main controller 5 includes a microcomputer or a similar device having a combination of an input/output port, a processing section, a ROM, and a RAM. The main controller 5 operates in accordance with a program stored in the ROM.

The power supply circuit 9 receives ac power via the power supply cord 10. The power supply circuit 9 converts the ac power into dc power. The power supply circuit 9 feeds the dc power to the radio circuit 2, the radio circuit controller 3, the channel codec section 4, the main controller 5, the memory 6, and the telephone line interface 7 to activate them.

The switch 11 can be manually changed between first and second positions. The switch 11 feeds the main controller 5 with a signal representing whether the switch 11 is in the first position or the second position. The main controller 5 is programmed to implement the following processes. When the output signal of the switch 11 represents that the switch 11 is in the first position, the main controller 5 reads out the information piece of the pseudo base radio station 30 from the memory 6. When the output signal of the switch 11 represents that the switch 11 is in the second position, the main controller 5 reads out the information piece of the actual base radio station "E" from the memory 6.

An inspection of the fixed subscriber unit 20 in the manufacturing factory will be explained hereinafter. The fixed subscriber unit 20 and the pseudo base radio station 30 are designed according to the TDMA/TDD PHS (Personal Handy Phone) standards. In the manufacturing factory, before the inspection of the fixed subscriber unit 20 is started, the switch 11 is set to the first position which corresponds to the pseudo base radio station 30. During the inspection of the fixed subscriber unit 20, the pseudo base radio station 30 repetitively transmits an LCCH signal to the fixed subscriber unit 20 at a predetermined period via a logic control channel (LCCH) being one of the control channels. The LCCH signal transmitted from the pseudo base radio station 30 contains an information piece of a system ID of the pseudo base radio station 30.

During the inspection of the fixed subscriber unit 20, the power supply cord 10 is connected to an ac power line, and hence the fixed subscriber unit 20 starts to operate. Then, the fixed subscriber unit 20 receives and accepts the LCCH signal from the pseudo base radio station 30 in response to the registered base-radio-station information in the memory 6 provided that the fixed subscriber unit 20 operates normally.

The registered base-radio-station information in the memory 6 includes an information piece representing the carrier identification number (the control carrier number) of the logic control channel (LCCH) assigned to and used by the pseudo base radio station 30, and an information piece representing the system ID of the pseudo base radio station 30.

The main controller 5 is programmed to implement the following processes. After the fixed subscriber unit 20 starts to operate, the main controller 5 decides whether the switch 11 is in the first position or the second position by referring to the output signal of the switch 11. Since the switch 11 is in the first position during the inspection of the fixed subscriber unit 20, the main controller 5 recognizes that the switch 11 is in the first position. Thus, the main controller 5 accesses the information piece of the pseudo base radio station 30 in the memory 6 rather than the information piece of the actual base radio station "E" therein. Specifically, the main controller 5 reads out the information piece of the control carrier number from the memory 6 which relates to the pseudo base radio station 30. The main controller 5 generates a frequency setting signal in response to the readout information piece of the control carrier number. The main controller 5 outputs the frequency setting signal to the radio circuit controller 3. The radio circuit controller 3 converts the frequency setting signal into a corresponding control signal. The radio circuit controller 3 outputs the control signal to the frequency synthesizer 2a in the radio circuit 2. Thus, the frequency of the signal generated by the frequency synthesizer 2a is set to a value corresponding to the previously-mentioned control carrier number. Subsequently, the main controller 5 accesses the radio circuit 2 via the channel codec section 4, and changes the radio circuit 2 to a continuous reception state in which the radio circuit 2 continuously receives the logic control channel (LCCH) assigned to the pseudo base radio station 30. When the radio circuit 2 is in the continuous reception state, it receives the LCCH signal from the pseudo base radio station 30. The main controller 5 reads out the information of the system ID of the pseudo base radio station 30 from the memory 6. Then, the main controller 5 starts an LCCH-signal search process.

During an LCCH-signal search mode of operation of the fixed subscriber unit 20, the main controller 5 fetches, from the channel codec section 4, an information piece of a system ID (a received system ID) which is derived from the received LCCH signal. The main controller 5 collates the received system ID with the registered system ID which is read out from the memory 6. When the received system ID agrees with the registered system ID, the main controller 5 controls the channel codec section 4 to capture the pseudo base radio station 30 which transmits the received LCCH signal. Subsequently, the main controller 5 controls the channel codec section 4 and also controls the radio circuit 2 via the channel codec section 4 so that positional information of the fixed subscriber unit 20 will be transmitted to and registered in the pseudo base radio station 30.

In the actual WLL-based telephone network of FIG. 7, the fixed subscriber unit 20 and the actual base radio station "E" are designed according to the TDMA/TDD PHS (Personal Handy Phone) standards. When the fixed subscriber unit 20 is placed in the actual WLL-based telephone network of FIG. 7, the switch 11 is set to the second position which corresponds to the actual base radio station "E". While operation of the actual base radio station "E" remains in a stand-by mode, the actual base radio station "E" repetitively transmits an LCCH signal to the fixed subscriber unit 20 at a predetermined period via a logic control channel (LCCH) being one of the control channels. The LCCH signal transmitted from the actual base radio station "E" contains an information piece of a system ID of the actual base radio station "E".

When the power supply cord 10 is connected to an ac power line, the fixed subscriber unit 20 starts to operate. Then, the fixed subscriber unit 20 receives and accepts the LCCH signal from the actual base radio station "E" in response to the registered base-radio-station information in the memory 6.

The registered base-radio-station information in the memory 6 includes an information piece representing the carrier identification number (the control carrier number) of the logic control channel (LCCH) assigned to and used by the actual base radio station "E", and an information piece representing the system ID of the actual base radio station "E".

The main controller 5 is programmed to implement the following processes. After the fixed subscriber unit 20 starts to operate, the main controller 5 decides whether the switch 11 is in the first position or the second position by referring to the output signal of the switch 11. Since the switch 11 is set to the second position when the fixed subscriber unit 20 is placed in the actual WLL-based telephone network of FIG. 7, the main controller 5 recognizes that the switch 11 is in the second position. Thus, the main controller 5 accesses the information piece of the actual base radio station "E" in the memory 6 rather than the information piece of the pseudo base radio station 30 therein. Specifically, the main controller 5 reads out the information piece of the control carrier number from the memory 6 which relates to the actual base radio station "E". The main controller 5 generates a frequency setting signal in response to the readout information piece of the control carrier number. The main controller 5 outputs the frequency setting signal to the radio circuit controller 3. The radio circuit controller 3 converts the frequency setting signal into a corresponding control signal. The radio circuit controller 3 outputs the control signal to the frequency synthesizer 2a in the radio circuit 2. Thus, the frequency of the signal generated by the frequency synthesizer 2a is set to a value corresponding to the previously-mentioned control carrier number. Subsequently, the main controller 5 accesses the radio circuit 2 via the channel codec section 4, and changes the radio circuit 2 to a continuous reception state in which the radio circuit 2 continuously receives the logic control channel (LCCH) assigned to the actual base radio station "E". When the radio circuit 2 is in the continuous reception state, it receives the LCCH signal from the actual base radio station "E". The main controller 5 reads out the information of the system ID of the actual base radio station "E" from the memory 6. Then, the main controller 5 starts an LCCH-signal search process.

During an LCCH-signal search mode of operation of the fixed subscriber unit 20, the main controller 5 fetches, from the channel codec section 4, an information piece of a system ID (a received system ID) which is derived from the received LCCH signal. The main controller 5 collates the received system ID with the registered system ID which is read out from the memory 6. When the received system ID agrees with the registered system ID, the main controller 5 controls the channel codec section 4 to capture the actual base radio station "E" which transmits the received LCCH signal. Subsequently, the main controller 5 controls the channel codec section 4 and also controls the radio circuit 2 via the channel codec section 4 so that positional information of the fixed subscriber unit 20 will be transmitted to and registered in the actual base radio station "E". The positional information of the fixed subscriber unit 20 is further transmitted from the actual base radio station "E" to the communication apparatus "I" in the telephone office "H". As a result, the fixed subscriber unit 20 is able to accept an incoming call. When the registration of the positional information of the fixed subscriber unit 20 has been completed, the fixed subscriber unit 20 falls into a stand-by state.

Figure 10:
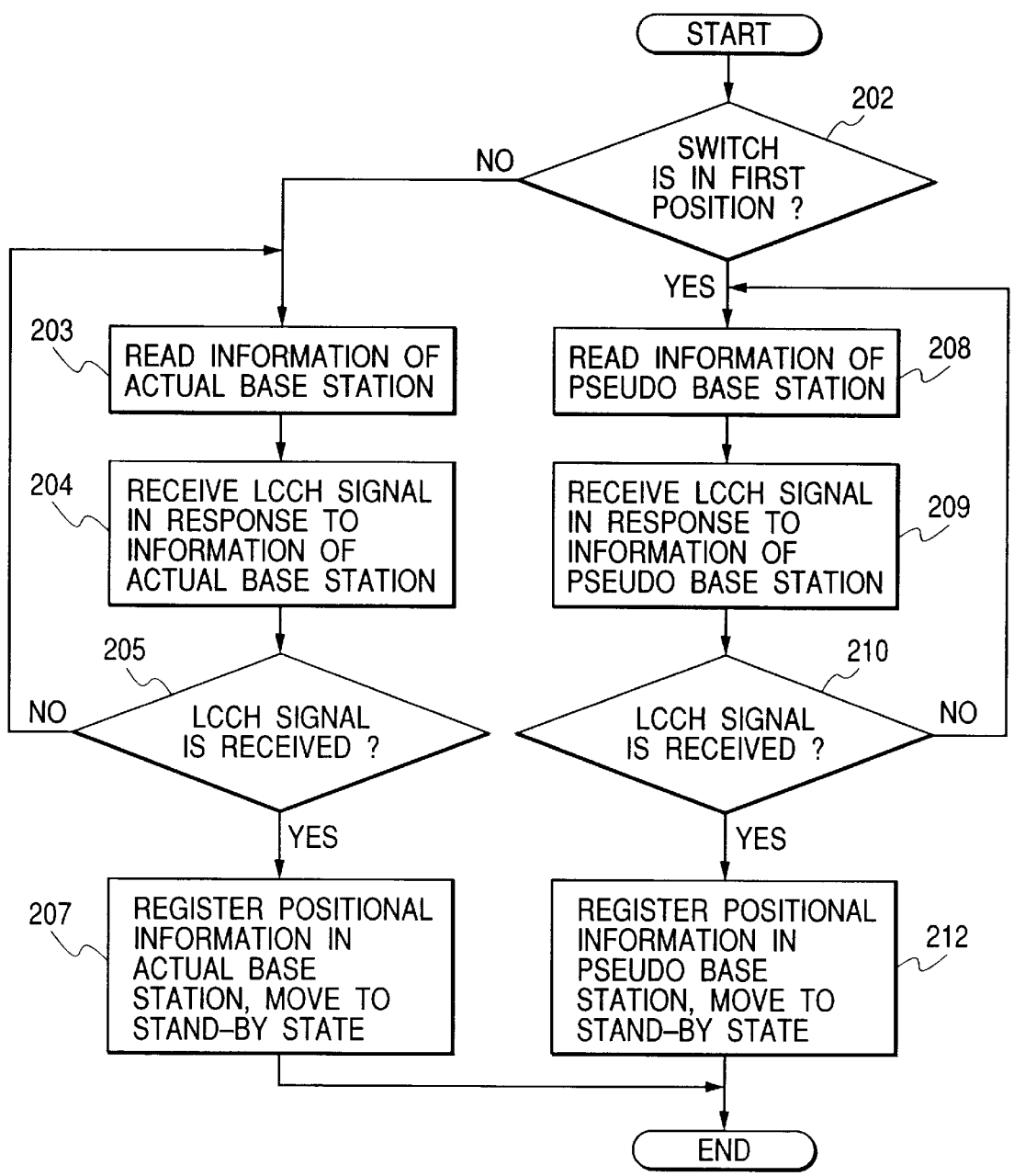
FIG. 10 is a flowchart of a segment of a program for a main controller in FIG. 9.

FIG. 10 is a flowchart of a segment of the program for the main controller 5. The program segment in FIG. 10 is started when the fixed subscriber unit 20 is powered.

As shown in FIG. 10, a first step 202 of the program segment decides whether the switch 11 is in the first position or the second position by referring to the output signal of the switch 11. When the switch 11 is in the first position which corresponds to the pseudo base radio station 30, the program advances from the step 202 to a step 208. When the switch 11 is in the second position which corresponds to the actual base radio station "E", the program advances from the step 202 to a step 203.

The step 203 reads out the information piece of the actual base radio station "E" from the memory 6. Specifically, the step 203 reads out the information piece of the control carrier number from the memory 6 which relates to the actual base radio station "E". The step 203 generates a frequency setting signal in response to the readout information piece of the control carrier number. The step 203 outputs the frequency setting signal to the radio circuit controller 3. The radio circuit controller 3 converts the frequency setting signal into a corresponding control signal. The radio circuit controller 3 outputs the control signal to the frequency synthesizer 2a in the radio circuit 2. Thus, the frequency of the signal generated by the frequency synthesizer 2a is set to a value corresponding to the previously-mentioned control carrier number. Subsequently, the step 203 accesses the radio circuit 2 via the channel codec section 4, and changes the radio circuit 2 to a continuous reception state.

A step 204 following the step 203 controls the radio circuit 2 via the channel codec section 4 so that the radio circuit 2 will try to receive the LCCH signal from the actual base radio station "E" for a predetermined length of time.

A step 205 subsequent to the step 204 decides whether the reception of the LCCH signal from the actual base radio station "E" has succeeded or failed by referring to the information recovered by the channel codec section 4. When the reception of the LCCH signal has succeeded, the program advances from the step 205 to a step 207. When the reception of the LCCH signal has failed, the program returns from the step 205 to the step 203.

The step 207 reads out the information of the system ID of the actual base radio station "E" from the memory 6. Then, the step 207 starts an LCCH-signal search process. Specifically, the step 207 fetches, from the channel codec section 4, an information piece of a system ID (a received system ID) which is derived from the received LCCH signal. The step 207 collates the received system ID with the registered system ID which is read out from the memory 6. When the received system ID agrees with the registered system ID, the step 207 controls the channel codec section 4 to capture the actual base radio station "E" which transmits the received LCCH signal. Subsequently, the step 207 controls the channel codec section 4 and also controls the radio circuit 2 via the channel codec section 4 so that positional information of the fixed subscriber unit 20 will be transmitted to and registered in the actual base radio station "E". The positional information of the fixed subscriber unit 20 is further transmitted from the actual base radio station "E" to the communication apparatus "I" in the telephone office "H". As a result, the fixed subscriber unit 20 is able to accept an incoming call. When the registration of the positional information of the fixed subscriber unit 20 has been completed, the step 207 enables the fixed subscriber unit 20 to fall into a stand-by state. After the step 207, the current execution cycle of the program segment ends.

The step 208 reads out the information piece of the pseudo base radio station 30 from the memory 6. Specifically, the step 208 reads out the information piece of the control carrier number from the memory 6 which relates to the pseudo base radio station 30. The step 208 generates a frequency setting signal in response to the readout information piece of the control carrier number. The step 208 outputs the frequency setting signal to the radio circuit controller 3. The radio circuit controller 3 converts the frequency setting signal into a corresponding control signal. The radio circuit controller 3 outputs the control signal to the frequency synthesizer 2a in the radio circuit 2. Thus, the frequency of the signal generated by the frequency synthesizer 2a is set to a value corresponding to the previously-mentioned control carrier number. Subsequently, the step 208 accesses the radio circuit 2 via the channel codec section 4, and changes the radio circuit 2 to the continuous reception state.

A step 209 following the step 208 controls the radio circuit 2 via the channel codec section 4 so that the radio circuit 2 will try to receive the LCCH signal from the pseudo base radio station 30 for a predetermined length of time.

A step 210 subsequent to the step 209 decides whether the reception of the LCCH signal from the pseudo base radio station 30 has succeeded or failed by referring to the information recovered by the channel codec section 4. When the reception of the LCCH signal has succeeded, the program advances from the step 210 to a step 212. When the reception of the LCCH signal has failed, the program returns from the step 210 to the step 208.

The step 212 reads out the information of the system ID of the pseudo base radio station 30 from the memory 6. Then, the step 212 starts an LCCH-signal search process. Specifically, the step 212 fetches, from the channel codec section 4, an information piece of a system ID (a received system ID) which is derived from the received LCCH signal. The step 212 collates the received system ID with the registered system ID which is read out from the memory 6. When the received system ID agrees with the registered system ID, the step 212 controls the channel codec section 4 to capture the pseudo base radio station 30 which transmits the received LCCH signal. Subsequently, the step 212 controls the channel codec section 4 and also controls the radio circuit 2 via the channel codec section 4 so that positional information of the fixed subscriber unit 20 will be transmitted to and registered in the pseudo base radio station 30. When the registration of the positional information of the fixed subscriber unit 20 has been completed, the step 212 enables the fixed subscriber unit 20 to fall into the stand-by state. After the step 212, the current execution cycle of the program segment ends.

Second Embodiment

A second embodiment of this invention is similar to the first embodiment thereof except for design changes indicated hereinafter. The second embodiment of this invention relates to a fixed subscriber unit 20B which is a modification of the fixed subscriber unit 20 in the first embodiment of this invention.

Figure 11:
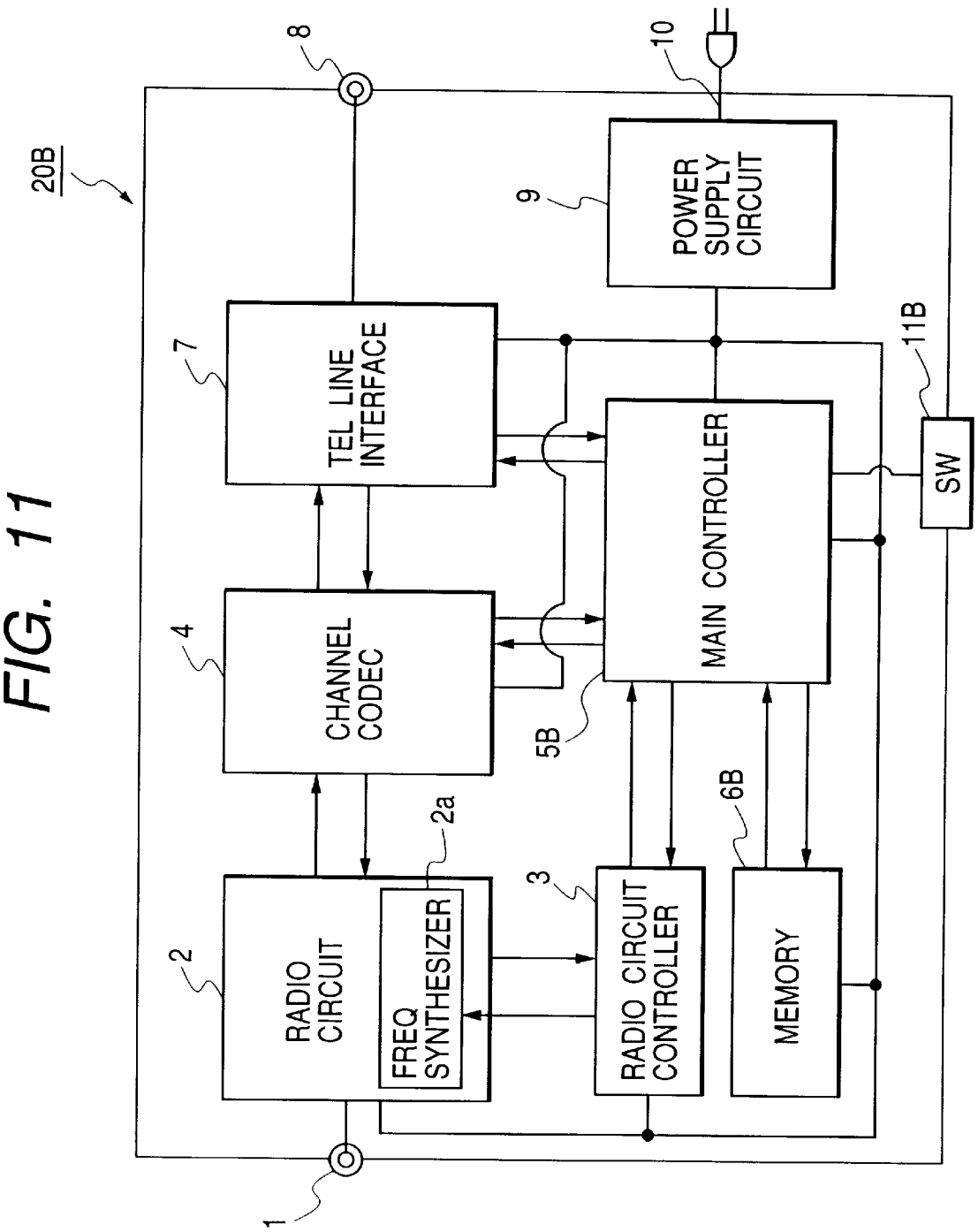
FIG. 11 is a block diagram of a fixed subscriber unit according to a second embodiment of this invention.

As shown in FIG. 11, the fixed subscriber unit 20B includes a main controller 5B, a memory 6B, and a switch 11B instead of the main controller 5, the memory 6, and the switch 11 of FIG. 9.

In the fixed subscriber unit 20B of FIG. 11, the memory 6B stores information which is used by the main controller 5B to recognize and capture a base radio station. Preferably, the memory 6B is of the nonvolatile type. Specifically, the memory 6B stores information pieces of at least two pseudo base radio stations respectively. Different address numbers or different identification numbers are assigned to the information pieces of the pseudo base radio stations respectively. Also, the memory 6B stores an information piece of an actual base radio station (the actual base radio station "E") with which the fixed subscriber unit 20B will be associated. For example, these information pieces are written into and registered in the memory 6B in the manufacturing factory.

The switch 11B can be manually changed between first and second positions. The switch 11B feeds the main controller 5B with a signal representing whether the switch 11B is in the first position or the second position. The main controller 5B is programmed to implement the following processes. When the output signal of the switch 11B represents that the switch 11B is in the first position, the main controller 5B reads out the information piece of one of the pseudo base radio stations from the memory 6B. When the output signal of the switch 11B represents that the switch 11B is in the second position, the main controller 5B reads out the information piece of the actual base radio station "E" from the memory 6B.

In the manufacturing factory, during an inspection of the fixed subscriber unit 20B, the telephone set 25 (see FIG. 8) is connected to the fixed subscriber unit 20B. When dial buttons of the telephone set 25 are depressed in accordance with the address number (the identification number) of a desired pseudo base radio station among the pseudo base radio stations, the telephone set 25 generates a signal for designating the information piece of the desired pseudo base radio station from among the information pieces of the pseudo base radio stations in the memory 6B. The designation signal is transmitted from the telephone set 25 to the fixed subscriber unit 20B via a telephone cord and the connector 8. In the fixed subscriber unit 20B, the designation signal is fed to the main controller 5B via the telephone line interface 7. The main controller 5B reads out the information piece of the desired pseudo base radio station from the memory 6B in response to the designation signal.

FIG. 12 is a flowchart of a segment of a program for the main controller 5B. The program segment in FIG. 12 is started when the fixed subscriber unit 20B is powered.

As shown in FIG. 12, a first step 402 of the program segment decides whether the switch 11 is in the first position or the second position by referring to the output signal of the switch 11. When the switch 11 is in the first position which corresponds to a pseudo base radio station, the program advances from the step 402 to a step 408. When the switch 11 is in the second position which corresponds to the actual base radio station "E", the program advances from the step 402 to a step 403.

The step 403 reads out the information piece of the actual base radio station "E" from the memory 6B. Specifically, the step 403 reads out the information piece of the control carrier number from the memory 6B which relates to the actual base radio station "E". The step 403 generates a frequency setting signal in response to the readout information piece of the control carrier number. The step 403 outputs the frequency setting signal to the radio circuit controller 3. The radio circuit controller 3 converts the frequency setting signal into a corresponding control signal. The radio circuit controller 3 outputs the control signal to the frequency synthesizer 2a in the radio circuit 2. Thus, the frequency of the signal generated by the frequency synthesizer 2a is set to a value corresponding to the previously-mentioned control carrier number. Subsequently, the step 403 accesses the radio circuit 2 via the channel codec section 4, and changes the radio circuit 2 to a continuous reception state.

A step 404 following the step 403 controls the radio circuit 2 via the channel codec section 4 so that the radio circuit 2 will try to receive the LCCH signal from the actual base radio station "E" for a predetermined length of time.

A step 405 subsequent to the step 404 decides whether the reception of the LCCH signal from the actual base radio station "E" has succeeded or failed by referring to the information recovered by the channel codec section 4. When the reception of the LCCH signal has succeeded, the program advances from the step 405 to a step 407. When the reception of the LCCH signal has failed, the program returns from the step 405 to the step 403.

The step 407 reads out the information of the system ID of the actual base radio station "E" from the memory 6B. Then, the step 407 starts an LCCH-signal search process. Specifically, the step 407 fetches, from the channel codec section 4, an information piece of a system ID (a received system ID) which is derived from the received LCCH signal. The step 407 collates the received system ID with the registered system ID which is read out from the memory 6B. When the received system ID agrees with the registered system ID, the step 407 controls the channel codec section 4 to capture the actual base radio station "E" which transmits the received LCCH signal. Subsequently, the step 407 controls the channel codec section 4 and also controls the radio circuit 2 via the channel codec section 4 so that positional information of the fixed subscriber unit 20B will be transmitted to and registered in the actual base radio station "E". The positional information of the fixed subscriber unit 20B is further transmitted from the actual base radio station "E" to the communication apparatus "I" in the telephone office "H" (see FIG. 7). As a result, the fixed subscriber unit 20B is able to accept an incoming call. When the registration of the positional information of the fixed subscriber unit 20B has been completed, the step 407 enables the fixed subscriber unit 20B to fall into a stand-by state. After the step 407, the current execution cycle of the program segment ends.

The step 408 accesses the telephone line interface 7 to decide whether or not the telephone set 25 is changed to its off-hook state. When the telephone set 25 is not changed to its off-hook state, the program exits from the step 408 and then enters the step 408 again to repeat the step 408. When the telephone set 25 is changed to its off-hook state, the step 408 decides whether or not a designation signal representative of a desired pseudo base radio station is inputted. It should be noted that the designation signal is inputted from the telephone set 25 to the fixed subscriber unit 20B by depressing dial buttons of the telephone set 25. When the designation signal is inputted, the program advances from the step 408 to a step 409. Otherwise, the program exists from the step 408 and then enters the step 408 again to repeat the step 408.

The step 409 reads out the information piece of a desired pseudo base radio station from the memory 6B which is represented by the designation signal. Specifically, the step 409 reads out the information piece of the control carrier number from the memory 6B which relates to the desired pseudo base radio station. The step 409 generates a frequency setting signal in response to the readout information piece of the control carrier number. The step 409 outputs the frequency setting signal to the radio circuit controller 3. The radio circuit controller 3 converts the frequency setting signal into a corresponding control signal. The radio circuit controller 3 outputs the control signal to the frequency synthesizer 2*a* in the radio circuit 2. Thus, the frequency of the signal generated by the frequency synthesizer 2*a* is set to a value corresponding to the previously-mentioned control carrier number. Subsequently, the step 409 accesses the radio circuit 2 via the channel codec section 4, and changes the radio circuit 2 to the continuous reception state.

A step 410 following the step 409 controls the radio circuit 2 via the channel codec section 4 so that the radio circuit 2 will try to receive the LCCH signal from the desired pseudo base radio station for a predetermined length of time.

A step 411 subsequent to the step 410 decides whether the reception of the LCCH signal from the desired pseudo base radio station has succeeded or failed by referring to the information recovered by the channel codec section 4. When the reception of the LCCH signal has succeeded, the program advances from the step 411 to a step 413. When the reception of the LCCH signal has failed, the program returns from the step 411 to the step 408.

The step 413 reads out the information of the system ID of the desired pseudo base radio station from the memory 6B. Then, the step 413 starts an LCCH-signal search process. Specifically, the step 413 fetches, from the channel codec section 4, an information piece of a system ID (a received system ID) which is derived from the received LCCH signal. The step 413 collates the received system ID with the registered system ID which is read out from the memory 6B. When the received system ID agrees with the registered system ID, the step 413 controls the channel codec section 4 to capture the desired pseudo base radio station which transmits the received LCCH signal. Subsequently, the step 413 controls the channel codec section 4 and also controls the radio circuit 2 via the channel codec section 4 so that positional information of the fixed subscriber unit 20B will be transmitted to and registered in the desired pseudo base radio station. When the registration of the positional information of the fixed subscriber unit 20B has been completed, the step 413 enables the fixed subscriber unit 20B to fall into the stand-by state. After the step 413, the current execution cycle of the program segment ends.

What is claimed is:

1. A fixed subscriber unit comprising:
    a memory storing first information for radio capture of an actual base radio station of a radio communication system and second information for radio capture of a pseudo base radio station of said radio communication system of said actual base radio station, the actual base radio station and the pseudo base radio station being of a same radio communication system;
    a switch whose position is changeable;
    first means connected to the memory and the switch for selecting one of the first information and the second information in response to the position of the switch; and
    second means for implementing radio capture of one of the actual base radio station and the pseudo base radio station in response to the information selected by the first means.

2. A method of inspecting a fixed subscriber unit including a memory which stores first information for reception of a first control radio channel assigned to an actual base radio station and second information for reception of a second control radio channel assigned to a pseudo base radio station, the actual base radio station and the pseudo base radio station being of a same radio communication system, the method comprising the steps of:
    selecting the second information from among the first information and the second information;
    enabling the fixed subscriber unit to receive the second radio channel in response to the selected second information; and
    implementing test radio communications between the fixed subscriber unit and the pseudo base radio station.

3. A method of inspecting a fixed subscriber unit including a memory which stores first information for radio capture of an actual base radio station, second information for radio capture of a first pseudo base radio station, and third information for radio capture of a second pseudo base radio station, wherein the actual base radio station, the first pseudo base radio station, and the second pseudo base radio station are of a same radio communication system, the method comprising the steps of:
    connecting a telephone set to the fixed subscriber unit;
    selecting one of the second information and the third information by operating the telephone set;
    enabling the fixed subscriber unit to implement radio capture of the first pseudo base radio station in response to the second information when the second information is selected; and enabling the fixed subscriber unit to implement radio capture of the second pseudo base radio station in response to the third information when the third information is selected.

4. A method as recited in claim 2, further comprising the steps of:

deciding whether the fixed subscriber unit succeeds or fails in reception of a control signal from the pseudo base radio station via the second radio channel when the fixed subscriber unit receives the second radio channel; and enabling the fixed subscriber unit to continue to receive the second radio channel.

5. A method of inspecting a fixed subscriber unit including a memory which stores first information for reception of a first control radio channel assigned to an actual base radio station with which said fixed subscriber unit is to be associated and second information for reception of a second control radio channel assigned to a pseudo base radio station, the actual base radio station and the pseudo base radio station being of a same radio communication system, the method comprising the steps of:

selecting the second information from among the first information and the second information;

enabling the fixed subscriber unit to receive the second radio channel in response to the selected second information; and inspecting the fixed subscriber unit by implementing test radio communications between the fixed subscriber unit and the pseudo base radio station.

6. A method as recited in claim 5, wherein said memory further stores third information for reception of a third control radio channel assigned to a second pseudo base radio station, said actual base radio station, said pseudo base radio station and said second pseudo base radio station all being of said same radio communication system, and comprising the further steps of:

connecting the fixed subscriber unit to a telephone set;

operating said telephone set to select one of said second information and said third information stored in said memory;

enabling the fixed subscriber unit to implement radio capture of said pseudo base radio station in response to the second information when the second information is selected by said operating step; and enabling the fixed subscriber unit to implement radio capture of said second pseudo base radio station in response to the third information when the third information is selected by said operating step;

said inspecting step thereby inspecting the fixed subscriber unit by implementing test radio communications between the fixed subscriber unit and the pseudo base radio station or the second pseudo base radio station in accordance with said operating step.

7. A method as recited in claim 6, wherein said fixed subscriber unit further includes a controller, and said operating step further comprises generating a designation signal by said telephone set for designating one of said second information and said third information for selection from said memory; including the further steps of transmitting said designation signal from said telephone set to said fixed subscriber unit via a telephone cord and said controller selecting the information designated by said designation signal for enabling the fixed subscriber unit to implement the radio capture of said pseudo base radio station or said second pseudo base radio station in accordance therewith, thereby implementing said test radio communications between said fixed subscriber unit and said pseudo base radio station or said second pseudo base radio station to inspect said fixed subscriber unit.

* * * * *